(12) United States Patent
Emby

(10) Patent No.: US 9,665,073 B2
(45) Date of Patent: May 30, 2017

(54) SENSOR

(71) Applicant: TRICKLESTAR LIMITED, Central, Hong Kong (HK)

(72) Inventor: Bernard Christopher Emby, Kuala Lumpur (MY)

(73) Assignee: TrickleStar Ltd, Causeway Bay (HK)

(*) Notice: Subject to any disclaimer, the term of this patent is extended or adjusted under 35 U.S.C. 154(b) by 433 days.

(21) Appl. No.: 14/205,928

(22) Filed: Mar. 12, 2014

(65) Prior Publication Data

US 2015/0137621 A1    May 21, 2015

Related U.S. Application Data

(60) Provisional application No. 61/907,035, filed on Nov. 21, 2013.

(51) Int. Cl.
G06F 1/32 (2006.01)
H04N 5/63 (2006.01)
G05B 11/01 (2006.01)
H02J 9/00 (2006.01)

(52) U.S. Cl.
CPC .......... G05B 11/01 (2013.01); G06F 1/3215 (2013.01); G06F 1/3228 (2013.01); G06F 1/3231 (2013.01); H02J 9/005 (2013.01); H04N 5/63 (2013.01); Y02B 60/12 (2013.01); Y10T 307/944 (2015.04)

(58) Field of Classification Search
CPC G05B 11/00; G05B 11/01; G06F 1/32; G06F 1/3203; G06F 1/3206; G06F 1/3209; G06F 1/3215; G06F 1/3228; G06F 1/3231; G06F 1/3234; G06F 1/3243; H02J 9/005; H04N 5/63; Y02B 60/12; Y10T 307/944

USPC .......................................... 307/39, 116, 140
See application file for complete search history.

(56) References Cited

U.S. PATENT DOCUMENTS

| | | | |
|---|---|---|---|
| 4,675,537 A | 6/1987 | Mione |
| 4,901,007 A | 2/1990 | Sworm |
| 4,970,623 A | 11/1990 | Pintar |
| 5,424,903 A | 6/1995 | Schreiber |
| 5,430,598 A | 7/1995 | Rodolfo et al. |
| 5,455,487 A | 10/1995 | Mix et al. |

(Continued)

FOREIGN PATENT DOCUMENTS

| DE | 19816560 A1 | 10/1999 |
|---|---|---|
| DE | 202005012443 U1 | 10/2005 |

(Continued)

OTHER PUBLICATIONS

Dunn, "Smart" Power Strips: Helping to Stop Idle Current Now!, available at http://www.treehugger.com/gadgets/smart-power-strip-helping-to-stop-idle-current-now.html, 2005.

Primary Examiner — Levi Gannon
(74) Attorney, Agent, or Firm — The Webb Law Firm

(57) ABSTRACT

The present invention generally pertains to a sensor (101), more particularly the present invention pertains to sensors for saving energy, wherein the sensor (101) comprising at least one input (11) for receiving signal, at least one output (12) for transmitting signal, and at least a sensing module (14) for sequentially sensing at least one activity of a user and determining power supply to at least one appliance by tracking a sequential predetermined period of time and detecting at least one activity.

23 Claims, 10 Drawing Sheets

(56) References Cited

U.S. PATENT DOCUMENTS

| | | | |
|---|---|---|---|
| 5,530,879 A * | 6/1996 | Crump | G06F 1/3203 379/93.36 |
| 5,598,042 A | 1/1997 | Mix et al. | |
| 5,731,947 A | 3/1998 | Hirose | |
| 5,780,775 A | 7/1998 | Yu | |
| 5,899,761 A | 5/1999 | Crane et al. | |
| 6,078,253 A | 6/2000 | Fowler | |
| 6,380,852 B1 | 4/2002 | Hartman et al. | |
| 6,445,936 B1 * | 9/2002 | Cannon | H02J 7/00 455/573 |
| 6,476,523 B1 | 11/2002 | Lee | |
| 6,476,695 B1 | 11/2002 | Nakamichi | |
| 6,509,655 B1 | 1/2003 | Wang | |
| 6,586,849 B2 | 7/2003 | Tarr | |
| 6,633,472 B2 | 10/2003 | Lai | |
| 6,731,024 B1 | 5/2004 | Molnar et al. | |
| 6,744,150 B2 | 6/2004 | Rendic | |
| 7,132,763 B2 | 11/2006 | Rendic | |
| 7,193,335 B2 | 3/2007 | Palmer et al. | |
| 7,622,822 B2 | 11/2009 | Gelonese | |
| 7,795,759 B2 | 9/2010 | DuBose et al. | |
| 7,795,760 B2 | 9/2010 | DuBose et al. | |
| 7,843,081 B2 | 11/2010 | Lim | |
| 7,944,086 B2 | 5/2011 | Hodges et al. | |
| 7,977,825 B2 | 7/2011 | Gilbert | |
| 8,110,942 B2 | 2/2012 | Ensinger | |
| 8,219,154 B2 | 7/2012 | Wakamatsu | |
| 8,669,716 B2 | 3/2014 | Recker et al. | |
| 9,106,099 B2 | 8/2015 | Gelonese | |
| 2002/0135474 A1 | 9/2002 | Sylliassen | |
| 2003/0102717 A1 | 6/2003 | Tarr | |
| 2005/0030680 A1 | 2/2005 | Lee et al. | |
| 2005/0162282 A1 | 7/2005 | Dresti et al. | |
| 2005/0270422 A1 * | 12/2005 | Hsieh | H04N 5/44 348/553 |
| 2005/0289378 A1 | 12/2005 | Vorenkamp et al. | |
| 2007/0038334 A1 | 2/2007 | Chou et al. | |
| 2007/0262646 A1 | 11/2007 | Lee | |
| 2007/0297112 A1 | 12/2007 | Gilbert | |
| 2008/0062333 A1 * | 3/2008 | Iwahashi | H04N 5/63 348/730 |
| 2009/0307505 A1 | 12/2009 | Robertson et al. | |
| 2009/0320055 A1 * | 12/2009 | Langille | H04H 20/42 725/14 |
| 2010/0079001 A1 | 4/2010 | Lee et al. | |
| 2010/0295371 A1 | 11/2010 | Lee et al. | |
| 2011/0043709 A1 * | 2/2011 | Hirata | G08C 17/00 348/734 |
| 2013/0338844 A1 | 12/2013 | Chan et al. | |

FOREIGN PATENT DOCUMENTS

| | | |
|---|---|---|
| EP | 1223752 A2 | 7/2002 |
| EP | 1653572 A1 | 5/2006 |
| EP | 1672466 A1 | 6/2006 |
| EP | 2045885 A2 | 4/2009 |
| EP | 2051379 A1 | 4/2009 |
| FR | 2728074 A1 | 6/1996 |
| GB | 2327819 A | 2/1999 |
| WO | 2006106310 A2 | 10/2006 |
| WO | 2008064410 A1 | 6/2008 |
| WO | 2009135250 A1 | 11/2009 |

* cited by examiner

Example 1

Example 2

SENSOR

FIELD OF THE INVENTION

The present invention generally pertains to a sensor, more particularly the present invention pertains to sensors for saving energy.

BACKGROUND OF INVENTION

There is a problem known as a standby power in the field of power supply and power distribution systems. This standby power problem can be also referred to as leaking electricity, phantom load, or vampire power. More specifically, the standby power is a wasted electrical energy that is consumed while electrical appliances are switched off but still connected to the main power supply.

These electrical appliances range from televisions, home entertainment systems, personal computers and peripherals, to space heaters, room air-conditioners and coffee pots, and that all of which continue to draw power even when they are turned off. Vampire power is a constant drain on people's wallets as well as the electrical grid at an average of 10-15 watts per hour per device, and that various government analyses estimate that the amount of standby power wasted accounts for as much as 12% of all residential power. The average United States household wastes over 1,300 kWh of electricity each year due to standby power, and the cost of standby power wasted by plug-in products in the United States is estimated at $4-8 billion annually.

There are several prior arts unveiled system and methods for saving energy. AU 2010256278 B2 discloses a system for monitoring power consumption of a plurality of electrical devices, wherein the system including means for communicating with an energy saving device of the type permitting energisation of a plurality of electrical devices from a single mains supply electrical outlet, and that the energy saving device having a plurality of controlled electrical outlets and a single electrical input adapted to connect to a mains supply electrical output, and switch means adapted to connect electrical supply from the mains supply electrical outlet to each of the controlled electrical outlets in response to a sensed state of at least one of the electrical devices, monitoring means for monitoring power consumption of the controlled electrical outlets, and output means for outputting data relating to the monitored power consumption.

U.S. Pat. No. 7,193,335 B2 discloses a socket assembly enables a number of electrical appliances to be automatically isolated from, and reconnected to, an electrical power supply upon respectively switching off or on a "master" appliance, the assembly includes a master electrical outlet and at least one slave electrical outlet both connectable to a common power source, sensing means for sensing power drawn from the master electrical outlet, and a controller operable to isolate the at least one slave electrical outlet from the power source when the sensing means detects a fall in power drawn from the master electrical outlet from a first, higher level to a second, lower level.

US 2013/0338844 A1 discloses an apparatus for monitoring power comprises a plurality of plugs, at least one sensor in communication with the plurality of outlets, and at least one microcontroller unit in communication with the at least one sensor, wherein each of the plurality of plugs is able to provide electrical power to a device. The at least one sensor is configured to monitor current flowing to the plurality of plugs, and the at least one microcontroller unit is configured to receive readings from the at least one sensor regarding the amount of current delivered to the plurality of plugs.

The apparatus, system and methods unveiled in the prior arts are however not intelligent in that the energy saving system and method do not overcome the problem of abrupt termination of electrical devices, and that abrupt termination of the electrical devices is a nuisance to the user if the user is still using the electrical appliances.

SUMMARY OF INVENTION

The objective of the present invention is to provide a sensor for determining power supply to at least one appliance by sequentially sensing at least one activity of a user, wherein the sensor terminates the power supply in the event that said at least one activity is undetected within a predetermined period of time.

It is an object of the present invention to provide a sensor comprising at least one input for receiving signal, at least one output for transmitting signal, and at least one sensing module for sequentially sensing at least one activity of a user and determining power supply to at least one appliance by tracking a sequential predetermined period of time and detecting at least one activity.

It is another object of the present invention to provide a sensor comprising at least one input for receiving signal, at least one output for transmitting signal, and at least one sensing module, wherein said at least one sensing module comprises a logic module for sequentially sensing said at least one activity.

It is yet an object of the present invention to provide a sensor comprising at least one input for receiving signal, at least one output for transmitting signal, and at least one sensing module, wherein said at least one sensing module comprises a logic module for triggering an action by the end of said sequential predetermined period of time.

It is another object of the present invention to provide a sensor comprising at least one input for receiving signal, at least one output for transmitting signal, and at least one sensing module, wherein said at least one sensing module comprises a timer for tracking said sequential predetermined period of time.

It is another object of the present invention to provide a sensor comprising at least one input for receiving signal, at least one output for transmitting signal, and at least one sensing module, wherein the logic module regulates the timer to track a first predetermined period of time for detecting said at least one activity.

It is yet an object of the present invention to provide a sensing method of the sensor comprising the steps of detecting a first activity for a first predetermined period of time, detecting a second activity for a subsequent predetermined period of time if the first activity is undetected within the first predetermined period of time, triggering an alert by the end of the subsequent predetermined period of time if the second activity is undetected, and terminating power supply if the second activity is undetected by the end of the subsequent predetermined period.

The present invention provides that the sensor monitors activities of a user, such that the present invention is intelligent in sensing that the electrical appliances are still in use so as to prevent abrupt termination of power supply to the electrical appliances.

DETAILED DESCRIPTION OF EMBODIMENTS

Described below are preferred embodiments of the present invention with reference to the accompanying drawings. Each of the following preferred embodiments describes an example not limiting in any aspect.

Figure 1:
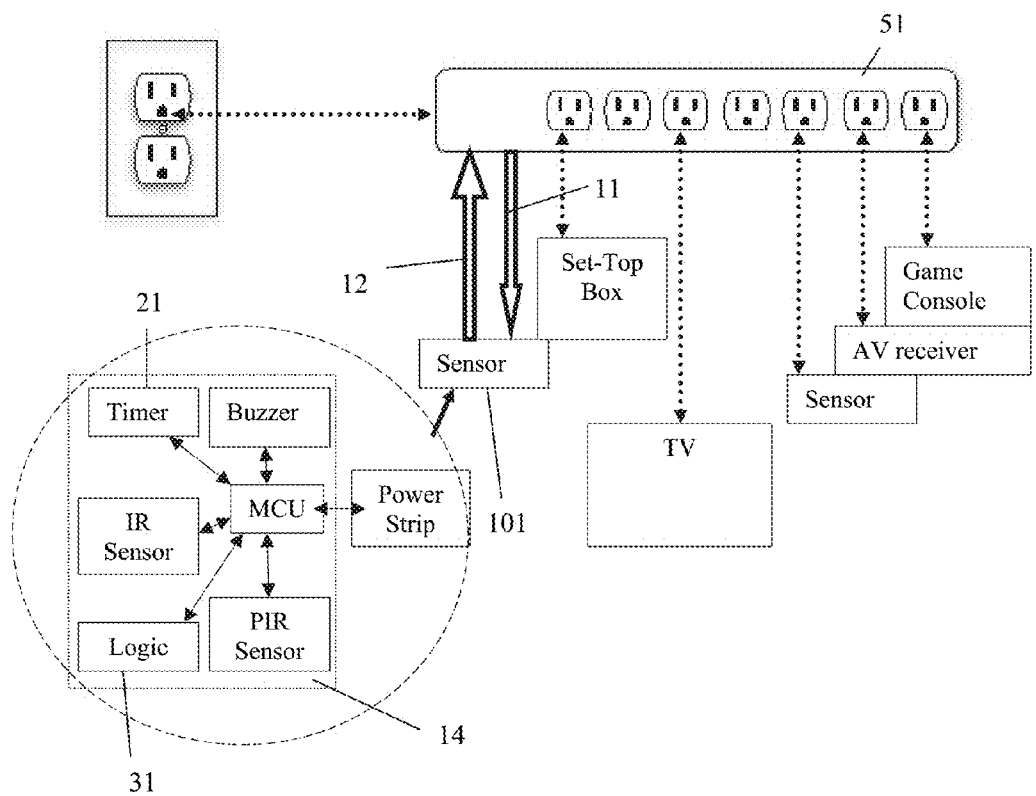
FIG. 1 illustrates a schematic representation of the present invention connected in a first embodiment configuration.
Figure 2:
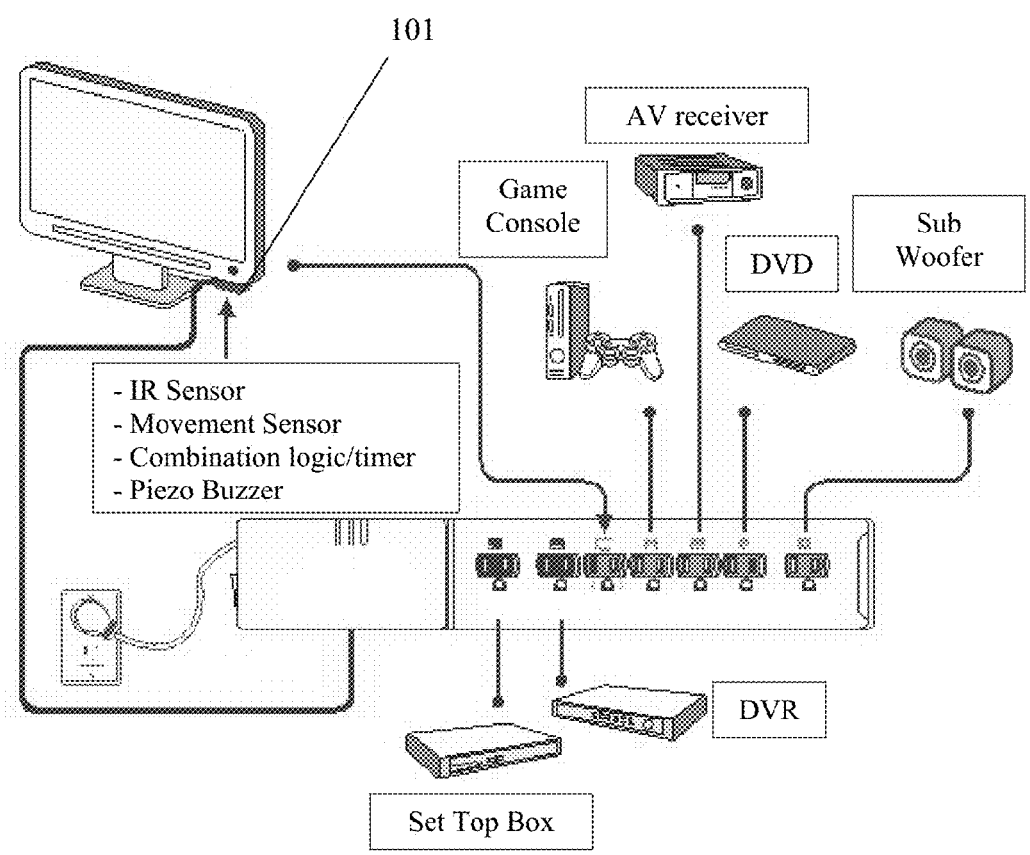
FIG. 2 illustrates a graphical representation of the present invention connected in a first embodiment configuration.
Figure 3:
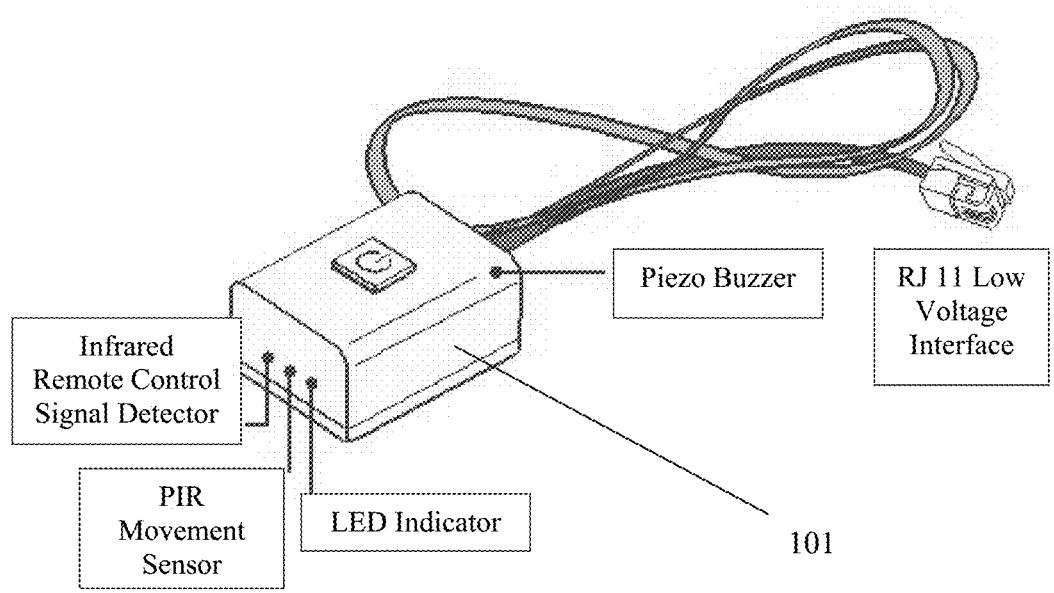
FIG. 3 illustrates a preferred embodiment of the present invention.

Referring to FIG. 1, FIG. 2 and FIG. 3, FIG. 1 illustrates a schematic representation of the present invention connected in a first embodiment configuration, FIG. 2 illustrates a graphical representation of the present invention connected in a first embodiment configuration showing the types of electrical appliances in connectivity with the present invention, and FIG. 3 illustrates the device of the present invention for configuration within the first embodiment of the present invention.

Figure 10:
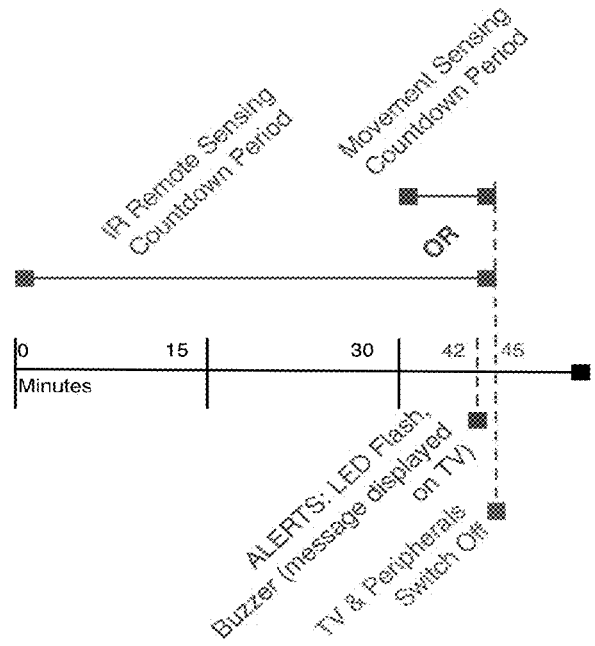
FIG. 10 illustrates a graph representation on examples of determination of period for operating the preferred embodiment of the present invention.
Figure 10:
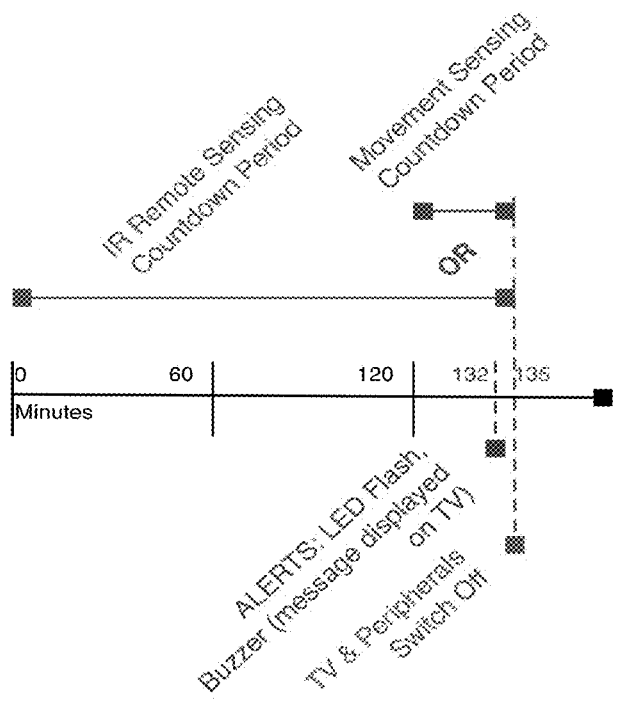

The present invention is a sensor (101) for determining power supply to at least one appliance by sensing a first activity of a user and sequentially sensing a second activity of a user and sequentially sensing a second activity of a user in an event the first activity is undetected, wherein the sensor (101) terminates the power supply in an event the second activity is undetected within a predetermined period of time. However, the first activity and the second activity are different from one another as shown in FIG. 10.

The sensor (101) comprising at least one input (11) for receiving signal of power state status of at least one electrical appliance connected to the sensor (101), at least one output (12) for transmitting signal, and at least one sensing module (14) for sensing at least an activity for determining power supply to at least one appliance.

Said at least one sensing module (14) ultimately tracks at least one predetermined period of time and detecting at least one activity, and managing the tracking of said at least one predetermined period of time and detection of said at least one activity so as to determine power supply to at least one appliance and transmitting control signal for establishing power state of said at least one appliance via said at least one output (12).

Said at least one sensing module (14) comprises a microcontroller unit, the microcontroller unit comprises a logic module (31) for sequentially sensing said at least one activity, and that the logic module (31) triggers an action by the end of said sequential predetermined period of time.

Further, wherein the microcontroller unit comprises a timer (21) for tracking said sequential predetermined period of time. Operation of the timer (21) is programmed to decrement a count-down timer from a predetermined starting value toward zero, wherein the time to decrement from the predetermined starting value to zero corresponds to a predetermined count-down time interval. The predetermined starting value is preferably but not limited to a programmable variable of the microcontroller unit.

With accordance to the present invention, the logic module (31) regulates the timer (21) to track a first predetermined period of time for detecting a first activity and triggers an action for the timer (21) to track a subsequent predetermined period of time for detecting a second activity in the event that the first activity is not detected. The first activity is any one of an infra-red activity from an infra-red enabled remote control, or occupancy of a user within a predetermined vicinity. The occupancy of a user is movement of the user.

After which, the logic module (31) then triggers an action for an alert via an alerting means to a user by the end of the subsequent predetermined period of time in an event that the second activity is undetected. The second activity is any one of an infra-red activity from an infra-red enabled remote control, or occupancy of a user within a predetermined vicinity. The occupancy of a user is movement of the user.

It should be appreciated that the first activity and second activity are different from one another as shown in FIG. 10, and this objective is explained in that whereby correct determination of user presence by sensing a first activity and sequentially sensing a second activity that is different from the first activity provides a better methodology for detecting user presence and avoids undesired switching off of equipment.

The alerting means comprises preferably but not limited to an audio alert or a visual alert. Preferably, the sensor (101) is configured to be connected to a power strip, incorporated with the power strip, configured with high definition multimedia interface capabilities, configured with an infra-red sensor, or a passive infra-red sensor, or in a combination thereof.

As shown in FIG. 1, the sensor (101) is connected to a power strip (51) via a controller for controlling operation of the power strip or the high definition multimedia interface, such that the controller in FIG. 1 is for controlling power supply to the electrical appliances connected to the power strip (51). The sensor (101) comprising at least one sensing module (14), said at least one sensing module (14) comprising a microcontroller unit, an infra-red sensor, and a passive infra-red sensor. The microcontroller unit includes an internal or external count-down timer and internal circuitry for receiving and processing the infra-red and passive infra-red sense signals.

The sensing method of the sensor (101) in accordance to the present invention, comprising the steps of initially detecting a first activity for a first predetermined period of time, detecting a second activity for a subsequent predetermined period of time if the first activity is undetected within the first predetermined period of time, then triggering an alert by the end of the second predetermined period of time if the subsequent activity is undetected, and terminating power supply if the second activity is not detected by the end of the alerting period.

Said at least one subsequent predetermined period is triggered in the event that the first activity is undetected within said at least one first predetermined period, and that an alerting means is triggered in the event that a subsequent activity is undetected by the end of said at least one second predetermined period. The alerting means preferably comprises but not limited to an audio alert or visual alert, such as a miniature buzzer in addition to a flashing Light Emitting Diode (LED) to warn of a pending shutdown.

The first activity is any one of an infra-red activity from an infra-red enabled remote control, or occupancy of a user within a predetermined vicinity. The occupancy of a user is movement of the user. The second activity is any one of an infra-red activity from an infra-red enabled remote control, or occupancy of a user within a predetermined vicinity. The occupancy of a user is movement of the user.

Accordingly, the infra-red sensor outputs an infra-red sensed signal to the microcontroller unit in response to the receipt of one or more infra-red signals by the infra-red sensor, for example from an infra-red enabled remote control. The passive infra-red sensor outputs a passive infra-red sensed signal to the microcontroller unit response to the passive infra-red sensor sensing movement in a field of view of the passive infra-red sensor.

The sensor (101) is preferably, but not limited to any one or in combination of infra-red sensor, passive infra-red sensor, motion sensor, and radio frequency sensor. With regards the timer (21) operation, if the microcontroller unit receives the infra-red sensed signal or the passive infra-red sensed signal during a time the count-down timer is counting down from a predetermined starting value to zero, the microcontroller unit resets the value in the count-down timer back to the predetermined starting value and commences decrementing the count-down timer anew. This operation is known as the resettable timer function.

Preferably, the microcontroller unit is programmed for sensing only the infra-red sense signal 20 during a first time interval (e.g., between 0 and 30 minutes) of the count-down timer decrementing from a predetermined starting value and ignores the passive infra-red sensed signal. After the first time interval, the microcontroller unit, based on its programming, senses for the passive infra-red sensed signal for a second time interval (e.g., between 30 minutes and 45 minutes).

In the absence of the microcontroller unit receiving the passive infra-red sensed signal before the expiration of the second time interval, the microcontroller unit outputs to the power strip, a control signal that causes internal circuitry of the power strip, e.g., a suitable switch, to terminate the supply of electrical power to switched outlets of the power strip, which switched outlets can be used to supply power to one or more of the following connected to the switched outlets, such as television, digital video decoder player, audio visual receiver, and/or, game console.

Ultimately, the sensor (101) of the present invention supports infra-red remote control signal detection and passive infra-red movement detection, and that the sensor (101) is provided with a countdown timer and logic engine that senses for infra-red activity for a period and then also senses for user movement. After a designated period either infra-red activity or movement detection will cause the timer to reset and delay a shutdown of electrical appliances and peripheral devices. The infra-red sensor and passive infra-red movement detector are preferably housed but not limited to in a power strip or housed in an external device connected to the power strip.

Figure 4:
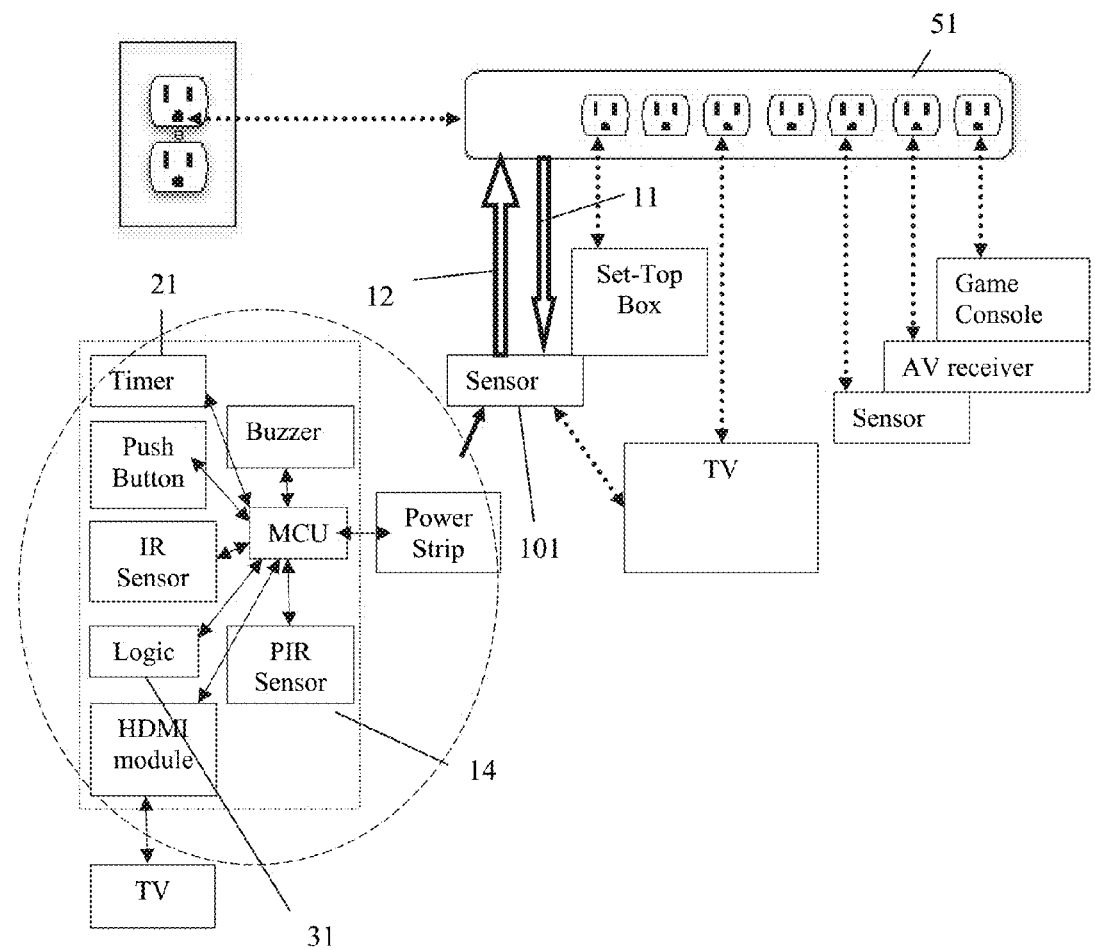
FIG. 4 illustrates a schematic representation of the present invention connected in a second embodiment configuration.
Figure 5:
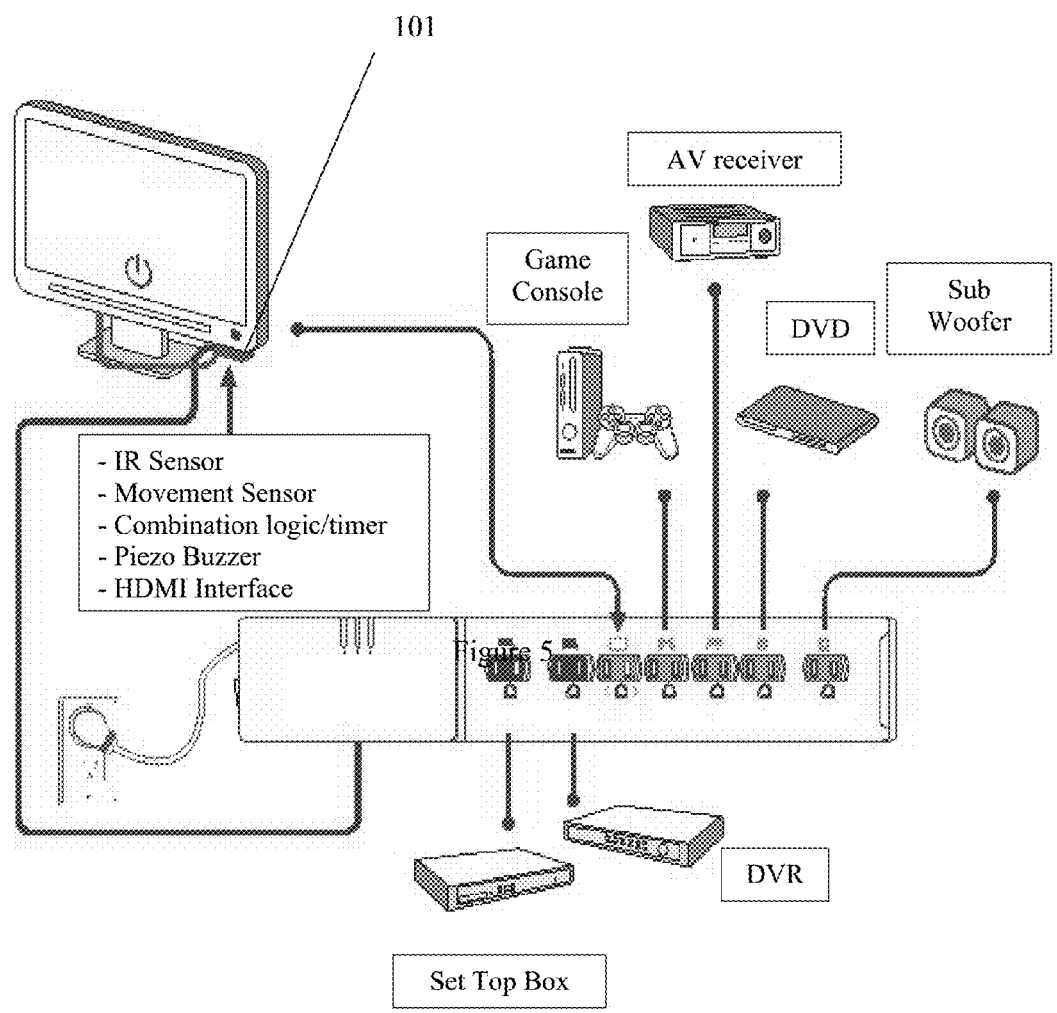
FIG. 5 illustrates a graphical representation of the present invention connected in a second embodiment configuration.
Figure 6:
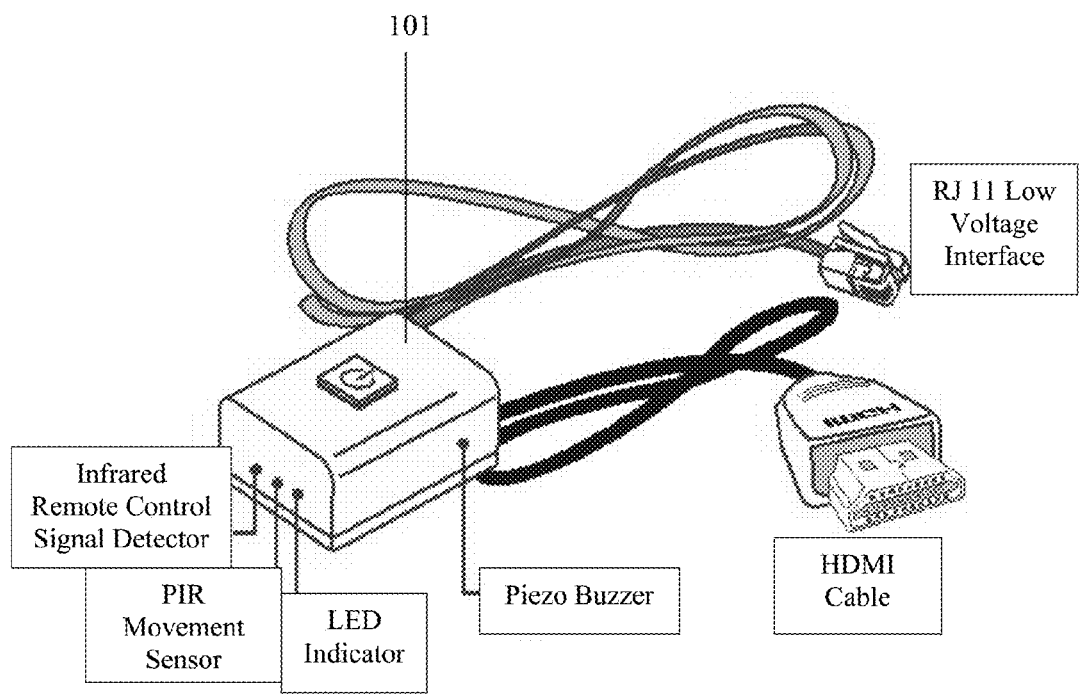
FIG. 6 illustrates a preferred embodiment of the present invention.

Referring to FIG. 4, FIG. 5 and FIG. 6, FIG. 4 illustrates a schematic representation of the present invention connected in a second embodiment configuration, FIG. 5 illustrates a graphical representation of the present invention connected in a second embodiment configuration showing the types of electrical appliances in connectivity with the present invention, and FIG. 6 illustrates the device of the present invention for configuration within the second embodiment of the present invention.

The present invention is a sensor (101) for determining power supply to at least one appliance by sequentially sensing at least one activity of a user, wherein the sensor (101) terminates the power supply in an event that said at least one activity is undetected within a predetermined period of time.

The sensor (101) comprising at least one input (11) for receiving signal of power state status of at least one electrical appliance connected to the sensor (101), at least one output (12) for transmitting signal, and at least a sensing module (14) for sequentially sensing at least one activity of a user and determining power supply to at least one appliance by tracking at least a predetermined period of time and detecting at least one activity.

Said at least one sensing module (14) ultimately tracks at least one predetermined period of time and detecting at least one activity, and managing the tracking of said at least one predetermined period of time and detection of said at least one activity so as to determine power supply to at least one appliance and transmitting control signal for establishing power state of said at least one appliance via said at least one output (12).

Said at least one sensing module (14) comprises a microcontroller unit, the microcontroller unit comprises a logic module (31) for a logic module (31) for sequentially sensing said at least one activity, and that the logic module (31) for triggers an action by the end of said sequential predetermined period of time.

Further, wherein the microcontroller unit comprises a timer (21) for tracking said sequential predetermined period of time. Operation of the timer (21) is programmed to decrement a count-down timer from a predetermined starting value toward zero, wherein the time to decrement from the predetermined starting value to zero corresponds to a predetermined count-down time interval. The predetermined starting value is preferably but not limited to a programmable variable of the microcontroller unit.

With accordance to the present invention, the logic module (31) regulates the timer (21) to track a first predetermined period of time for detecting a first activity and triggers an action for the timer (21) to track a subsequent predetermined period of time for detecting a second activity in the event that the first activity is not detected. The first activity is any one of an infra-red activity from an infra-red enabled remote control, radio frequency, or occupancy of a user within a predetermined vicinity. The occupancy of a user is movement of the user.

After which, the logic module (31) then triggers an action for an alert via an alerting means to a user by the end of the subsequent predetermined period of time in an event that the second activity is undetected. The second activity is any one of an infra-red activity from an infra-red enabled remote control, radio frequency or occupancy of a user within a predetermined vicinity. The occupancy of a user is movement of the user.

The alerting means comprises preferably but not limited to an audio alert or a visual alert.

Preferably, the sensor (101) is configured to be connected to a power strip, incorporated with the power strip, configured with high definition multimedia interface capabilities, configured with an infra-red sensor, or a passive infra-red sensor, or in a combination thereof.

As shown in FIG. 4, the sensor (101) is connected to a power strip (51) via a controller for controlling operation of the power strip or the high definition multimedia interface, such that the controller in FIG. 1 is for controlling power supply to the electrical appliances connected to the power strip (51). The sensor (101) comprising at least one sensing module (14), said at least one sensing module (14) comprising a microcontroller unit, an infra-red sensor, and a passive infra-red sensor. The microcontroller unit includes an internal or external count-down timer and internal circuitry for receiving and processing the infra-red and passive infra-red sense signals.

The sensing method of the sensor (101) in accordance to the present invention, comprising the steps of initially detecting a first activity for a first predetermined period of time, detecting a second activity for a subsequent predetermined period of time if the first activity is undetected within the first predetermined period of time, then triggering an alert by the end of the second predetermined period of time if the subsequent activity is undetected, and terminating power supply if the second activity is not detected by the end of the alerting period.

Said at least one subsequent predetermined period is triggered in the event that the first activity is undetected within said at least one first predetermined period, and that an alerting means is triggered in the event that a subsequent activity is undetected by the end of said at least one second predetermined period. The alerting means preferably comprises but not limited to an audio alert or visual alert, such as a miniature buzzer in addition to a flashing Light Emitting Diode (LED) to warn of a pending shutdown.

The first activity is any one of an infra-red activity from an infra-red enabled remote control, or occupancy of a user within a predetermined vicinity. The occupancy of a user is movement of the user. The second activity is any one of an infra-red activity from an infra-red enabled remote control, or occupancy of a user within a predetermined vicinity. The occupancy of a user is movement of the user.

Accordingly, the infra-red sensor outputs an infra-red sensed signal to the microcontroller unit in response to the receipt of one or more infra-red signals by the infra-red sensor, for example from an infra-red enabled remote control. The passive infra-red sensor outputs a passive infra-red sensed signal to the microcontroller unit response to the passive infra-red sensor sensing movement in a field of view of the passive infra-red sensor.

With regards the timer (21) operation, if the microcontroller unit receives the infra-red sensed signal or the passive infra-red sensed signal during a time the count-down timer is counting down from a predetermined starting value to zero, the microcontroller unit resets the value in the count-down timer back to the predetermined starting value and commences decrementing the count-down timer anew.

Preferably, the microcontroller unit is programmed for sensing only the infra-red sense signal during a first time interval (e.g., between 0 and 30 minutes) of the count-down timer decrementing from a predetermined starting value and ignores the passive infra-red sensed signal. After the first time interval, the microcontroller unit, based on its 15 programming, senses for the passive infra-red sensed signal for a second time interval (e.g., between 30 minutes and 45 minutes).

In the absence of the microcontroller unit receiving the passive infra-red sensed signal before the expiration of the second time interval, the 20 microcontroller unit outputs to the power strip, a control signal that causes internal circuitry of the power strip, e.g., a suitable switch, to terminate the supply of electrical power to switched outlets of the power strip, which switched outlets can be used to supply power to one or more of the following connected to the switched outlets, such as television, digital video decoder player, audio visual receiver, and/or, game console.

Ultimately, the sensor (101) of the present invention supports infra-red remote control signal detection and passive infra-red movement detection, and that the sensor (101) is provided with a countdown timer and logic engine that senses for infra-red activity for a period and then also senses for user movement. After a designated period either infra-red activity or movement detection will cause the timer to reset and delay a shutdown of electrical appliances and peripheral devices. The infra-red sensor and passive infra-red movement detector are preferably housed but not limited to in a power strip or housed in an external device connected to the power strip.

As shown in FIG. 4, FIG. 5 and FIG. 6, the sensor (101) can include a communication interface, preferably but not limited to a high definition multimedia interface (HDMI) module, which can be coupled with a television via an HDMI cable or at the same time accommodates HDMI CEC (consumer electronics control) function. In this embodiment, the microcontroller unit is preferably programmed to cause a message to be displayed on the television via a communication interface for warning user of an impending shutdown of the television and other devices connected to the power strip.

Moreover, the sensor preferably includes but not limited to an LED operating under the control of the microcontroller unit which can be programmed to cause the LED to illuminate or flash to warn of an of an impending shutdown of the television and other devices connected to the power strip. Still further, the sensor (101) preferably includes but not limited to an audio output device, e.g., a buzzer or audio speaker, operating under the control of the microcontroller unit which can be programmed to cause the audio output device to generate an audio warning of an impending shutdown of the television and other devices connected to the power strip.

Preferably, the microcontroller unit is programmed to cause the television warning to be displayed and/or the LED warning to be generated and/or the audio warning to be generated for a predetermined warning duration beginning a predetermined warning time before the expiration of the second time interval, e.g., 3 minutes before the expiration of the second time interval, and continuing until the microcontroller unit terminates the supply of electrical power to the power strip. Where the sensor includes two or more of the communication interface, the LED, and the audio output device, the microcontroller unit can operate each independently, e.g., the television warning, the LED warning, and the audio warning can have different warning durations and can be initiated at different times prior to the expiration of the second time interval.

Figure 7:
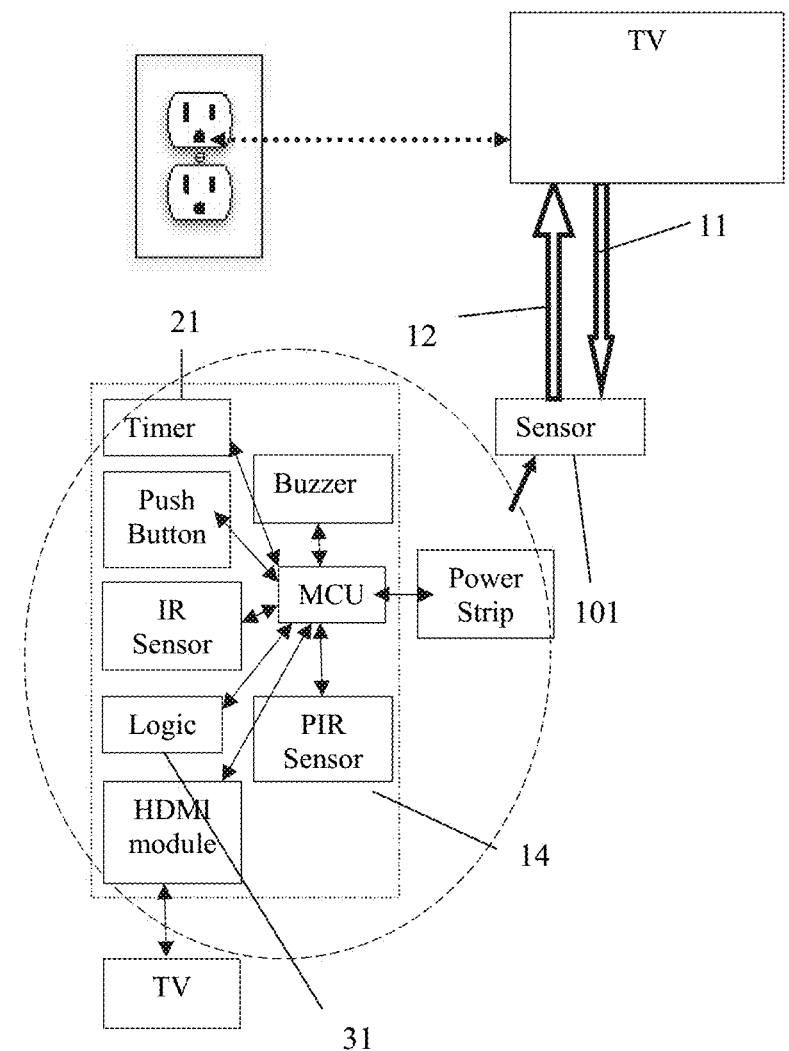
FIG. 7 illustrates a schematic representation of the present invention connected in a third embodiment configuration.
Figure 8:
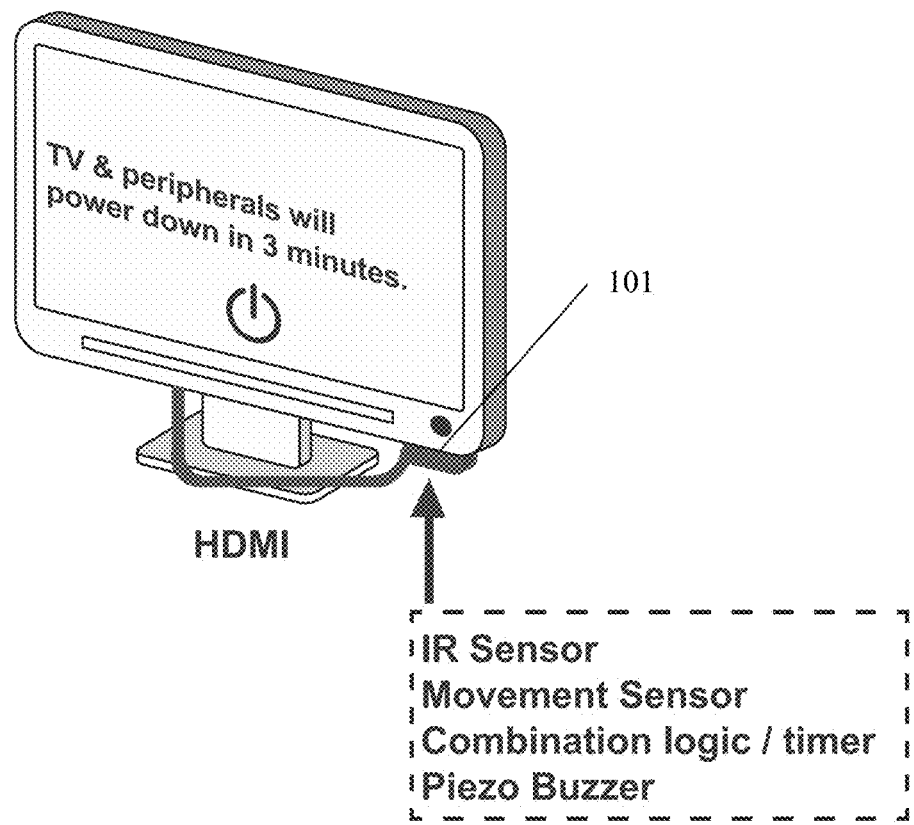
FIG. 8 illustrates a graphical representation of the present invention connected in a third embodiment configuration.
Figure 9:
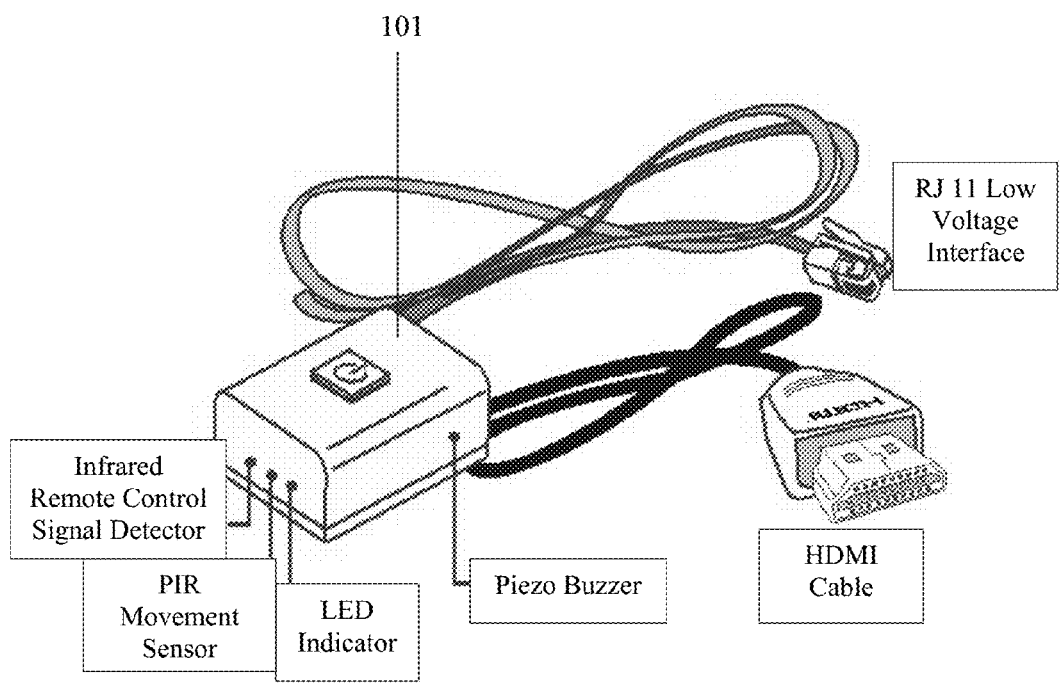
FIG. 9 illustrates a preferred embodiment of the present invention.

Referring to FIG. 7, FIG. 8 and FIG. 9, FIG. 7 illustrates a schematic representation of the present invention connected in a third embodiment configuration, FIG. 8 illustrates a graphical representation of the present invention connected in a third embodiment configuration showing the types of electrical appliances in connectivity with the present invention, and FIG. 9 illustrates the device of the present invention for configuration within the third embodiment of the present invention.

The present invention is a sensor (101) for determining power supply to at least one appliance by sequentially sensing at least one activity of a user, wherein the sensor (101) terminates the power supply in an event that said at least one activity is undetected within a predetermined period of time.

The sensor (101) comprising at least one input (11) for receiving signal of power state status of at least one electrical appliance connected to the sensor (101), at least one output (12) for transmitting signal, and at least one sensing module (14) for sequentially sensing at least one activity of a user and determining power supply to at least one appliance by tracking at least one predetermined period of time and detecting at least one activity.

Said at least one sensing module (14) ultimately tracks at least one predetermined period of time and detecting at least one activity, and managing the tracking of said at least one predetermined period of time and detection of said at least one activity so as to determine power supply to at least one appliance and transmitting control signal for establishing power state of said at least one appliance via said at least one output (12).

Said at least one sensing module (14) comprises a microcontroller unit, the microcontroller unit comprises a logic module (31) for a logic module (31) for sequentially sensing said at least one activity, and that the logic module (31) for triggers an action by the end of said sequential predetermined period of time.

Further, wherein the microcontroller unit comprises a timer (21) for tracking said sequential predetermined period of time. Operation of the timer (21) is programmed to decrement a count-down timer from a predetermined starting value toward zero, wherein the time to decrement from the predetermined starting value to zero corresponds to a predetermined count-down time interval. The predetermined starting value is preferably but not limited to a programmable variable of the microcontroller unit.

With accordance to the present invention, the logic module (31) regulates the timer (21) to track a first predetermined period of time for detecting a first activity and triggers an action for the timer (21) to track a subsequent predetermined period of time for detecting a second activity in the event that the first activity is not detected. The first activity is any one of an infra-red activity from an infra-red enabled remote control, or occupancy of a user within a predetermined vicinity. The occupancy of a user is movement of the user.

After which, the logic module (31) then triggers an action for an alert via an alerting means to a user by the end of the subsequent predetermined period of time in an event that the second activity is undetected. The second activity is any one of an infra-red activity from an infra-red enabled remote control, or occupancy of a user within a predetermined vicinity. The occupancy of a user is movement of the user. The alerting means comprises preferably but not limited to an audio alert or a visual alert.

Preferably, the sensor (101) is configured with high definition multimedia interface capabilities, configured with an infra-red sensor, or a passive infra-red sensor, or in a combination thereof.

As shown in FIG. 7, the sensor (101), which is a stand-alone configuration, is directly connected to the television for controlling power supply to the television. The sensor (101) comprising at least one sensing module (14), said at least one sensing module (14) comprising a microcontroller unit, an infra-red sensor, and a passive infra-red sensor. The microcontroller unit includes an internal or external count-down timer and internal circuitry for receiving and processing the infra-red and passive infra-red sense signals.

The sensing method of the sensor (101) in accordance to the present invention, comprising the steps of initially detecting a first activity for a first predetermined period of time, detecting a second activity for a subsequent predetermined period of time if the first activity is undetected within the first predetermined period of time, then triggering an alert by the end of the second predetermined period of time if the subsequent activity is undetected, and terminating power supply if the second activity is not detected by the end of the alerting period.

Said at least one subsequent predetermined period is triggered in the event that the first activity is undetected within said at least one first predetermined period, and that an alerting means is triggered in the event that a subsequent activity is undetected by the end of said at least one second predetermined period. The alerting means preferably comprises but not limited to an audio alert or visual alert, such as a miniature buzzer in addition to a flashing Light Emitting Diode (LED) to warn of a pending shutdown.

The first activity is any one of an infra-red activity from an infra-red enabled remote control, or occupancy of a user within a predetermined vicinity. The occupancy of a user is movement of the user. The second activity is any one of an infra-red activity from an infra-red enabled remote control, or occupancy of a user within a predetermined vicinity. The occupancy of a user is movement of the user.

Accordingly, the infra-red sensor outputs an infra-red sensed signal to the microcontroller unit in response to the receipt of one or more infra-red signals by the infra-red sensor, for example from an infra-red enabled remote control. The passive infra-red sensor outputs a passive infra-red sensed signal to the microcontroller unit response to the passive infra-red sensor sensing movement in a field of view of the passive infra-red sensor.

With regards the timer (21) operation, if the microcontroller unit receives the infra-red sensed signal or the passive infra-red sensed signal during a time the count-down timer is counting down from a predetermined starting value to zero, the microcontroller unit resets the value in the count-down timer back to the predetermined starting value and commences decrementing the count-down timer anew.

Preferably, the microcontroller unit is programmed for sensing only the infra-red sense signal during a first time interval (e.g., between 0 and 30 minutes) of the count-down timer decrementing from a predetermined starting value and ignores the passive infra-red sensed signal. After the first time interval, the microcontroller unit, based on its programming, senses for the passive infra-red sensed signal for a second time interval (e.g., between 30 minutes and 45 minutes).

In the absence of the microcontroller unit receiving the passive infra-red sensed signal before the expiration of the second 5 time interval, the microcontroller unit outputs a control signal that causes termination of power supply to one or more of the following connected to the switched outlets, such as a television, and/or audio visual receiver.

Ultimately, the sensor (101) of the present invention supports infra-red remote control signal detection and passive infra-red movement detection, and that the sensor (101) is provided with a countdown timer and logic engine that senses for infra-red activity for a period and then also senses for user movement. After a designated period either infra-red activity or movement detection will cause the timer to reset and delay a shutdown of electrical appliances and peripheral devices.

As shown in FIG. 7, FIG. 8 and FIG. 9, the sensor (101) can include a communication interface, preferably but not limited to a high definition multimedia interface (HDMI) module, which can be coupled with a television via an HDMI cable. In this embodiment, the microcontroller unit is preferably programmed to cause a message to be displayed on the television via a communication interface for warning user of an impending shutdown of the television and other devices connected to the sensor (101).

Moreover, the sensor preferably includes but not limited to an LED operating under the control of the microcontroller unit which can be programmed to cause the LED to illuminate or flash to warn of an of an impending shutdown of the television and other devices connected to the sensor (101). Still further, the sensor (101) preferably includes but not limited to an audio output device, e.g., a buzzer or audio speaker, operating under the control of the microcontroller unit which can be programmed to cause the audio output device to generate an audio warning of an impending shutdown of the television and other devices connected to the sensor (101).

Preferably, the microcontroller unit is programmed to cause the television warning to be displayed and/or the LED warning to be generated and/or the audio warning to be generated for a predetermined warning duration beginning a predetermined warning time before the expiration of the second time interval, e.g., 3 minutes before the expiration of the second time interval, and continuing until the microcontroller unit terminates the supply of electrical power to the television. Where the sensor includes two or more of the communication interface, the LED, and the audio output device, the microcontroller unit can operate each independently, e.g., the television warning, the LED warning, and the audio warning can have different warning durations and can be initiated at different times prior to the expiration of the second time interval. Also, the microcontroller unit of this embodiment is preferably programmed but not limited to cause the television to enter standby mode upon expiration of the second interval.

Referring to FIG. 10, the figure illustrates a graph representation on examples of determination of period for operating the preferred embodiment of the present invention.

It is shown in the graph that the sensor senses for infra-red (IR) remote control activity only for an initial period. After the initial period has lapsed with no infra-red activity detected, the sensor then starts to detect for user movement using a passive infrared detector (PIR). If either infra-red remote control activity or user movement are detected, the countdown timer then will reset.

If neither infra-red remote control activity nor movement is detected, then a warning is issued to a user warning. If still neither infra-red remote control activity nor movement is detected then the television and peripherals will switch off.

Plug-in load is the fastest growing category of residential and commercial energy use in North America. Standby power consists of small amounts of power being wasted across a number of appliances in homes or offices, which can add up to a sizeable amount. As the quantum of saved energy in a given home or office is small per individual appliance, applications where there are numerous devices such as a personal computers or television installation and a single product can be used for multiple appliances makes a stronger economic argument to have an energy saving product installed against installing a product to save energy for a single appliance. Hence energy saving devices control multiple appliances have a better economic justification for use.

A comparison table is appended in the following to compare between different technologies of power saving devices, and that television is used an example of an electrical appliance. It should be noted that the electrical appliance is not limited to a television. The present invention is capable to overcome issues as presented in the table.

TABLE 1

| Technology | Advantages | Problems |
|---|---|---|
| Television based infra-red activity sensing | Switches off television if no infra-red remote control activity is sensed for a period of time. | Users will often turn on a television with a remote control, but then use a set top box remote control to control the channels to watch and control volume. Set top box infra-red remote control activity is not detected by many televisions. To use the energy saving feature on the television, the user has to use the remote control, which in many instances does not happen because the user has chosen to use another remote control. This results in nuisance and lost in energy savings potential. |
| Type 2 power strip | Switches off peripherals automatically when television is switched off resulting in energy savings. | Television must be switched on for peripherals to operate. This is not always required, as the television is not controlled and energy savings for this technology is low. |
| Type 2 power strip with occupancy sensing | Saves standby and active energy, and provides a method to detect when user is not present and switches off appliances, resulting in larger energy savings. | Occupancy sensing is not always an optimal sensing option, as sunshine can cause false triggering or severely reduce detection capability. Also, pets can cause false triggering. The occupancy sensor can cause false triggering at |

TABLE 1-continued

| Technology | Advantages | Problems |
|---|---|---|
| Type 2 power strip with infra-red and current sensing | Saves standby and active energy from television. Infra-red sensing provides a method for determining user presence or absence and thus a mechanism for switching off the television when no remote activity is sensed for a period of time. The period of time is typically 60-75 minutes but on some products can be configurable. Using IR remote control sensing in addition to current master/slave sensing results in larger savings than from traditional master/slave only power strips. | non-preferable conditions. Also, if occupancy sensor is not sensitive enough, it may not detect a user and result in television and peripherals switching off unnecessarily. Infra-red activity sensing is an imperfect method for determining user presence. Users commonly use infra-red remote controls every few minutes to change channels, increase/decrease volume etc. when watching regular television. This type of viewing activity is well suited to IR sensing to determine user presence. However some users watch movies, which can be 2-3 hours long. During this time the user may never touch their remote control. This could cause their TV and peripherals to switch off if they did not. Setting the timer period too short can result in the APS switching off the TV and peripherals when someone is still watching TV. Setting the timer period too long results in lower/missed energy savings potential. There is a balance to be struck between sensing for an absence of IR activity and switching off the TV and peripherals to save energy and giving a user sufficient time to press a button on their remote control to avoid the TV and peripherals switching off unnecessarily and causing user frustration. |

Table 1 shows comparison between different technologies of power saving devices. There are a range of Relocatable PowerTaps (also known as PowerStrips and PowerTaps) available in the market, which have inbuilt intelligence to save energy. Relocatable PowerTaps with added intelligence are commonly known as Advanced PowerStrips (APS'). Within the APS category there are 2 types of products.

The problem with prior technologies is that:
the infra-red control sensing alone does not work well when users do not use their infra-red remote control frequently within a prescribed period of time;
setting the timer period for infra-red control using long detection period results in missed energy saving potential;
infra-red remote control sensing does not work well with users who use game consoles with handsets that are hardwired or using radio frequency communications;
motion sensing alone is prone to false triggering (by pets or passers by) and does not necessarily mean that a user is watching television; and
signaling of a pending shutdown is limited to flashing an LED and is not always well understood by users.

Type 1 Power Strip
Utilizes current sensing and a simple master and slave configuration to sense when a television is switched on and to then switch peripherals on, and to sense when the television is switched off and to switch the peripherals off.

Type 2 Power Strip
A more sophisticated product that utilizes multiple control and sensing technologies to control television peripherals as well as the television.
Utilizes current sensing and a simple master and slave configuration to sense when a television is switched on and to then switch peripherals on, and to sense when the television is switched off and to switch the peripherals off.
Utilizes infra-red sensor with a countdown timer to detect user presence or absence and then switch off a television and peripherals.

Type 1 power strip (utilising master and slave current sensing technology only) have lower energy savings potential as only the peripheral devices are controlled and the solution is reliant upon the user to switch off the television.

Type 2 power strip uses both master slave current sensing and infra-red remote control signal sensing. The combinations of these technologies allow for greater energy savings (television peripherals and television) as the product determines user presence by sensing for infra-red activity of an infra-red enabled remote control device (an indicator of user presence).

Television Energy Saving Features

Many late model televisions have energy saving features built in. These features detect infra-red remote control activity from the television remote control. If the television remote control activity is not sensed for a period of time, then the television will switch into standby mode to save energy. This energy saving feature is often not used because a user either may not know it exists, or the user may not know how to configure it, or it may not operate correctly with the way the user uses their equipment.

Summary

Maximizing energy savings are thus always desirable for energy efficiency programs and electric utilities. Accurate determination of user presence is critical. It underpins the logic of when and what equipment to switch off. Inaccurate determination of user presence can lead to unwanted switching and longer periods required to make product more useable resulting in less energy savings. Correct determination of user presence 5 by sensing for infra-red remote control activity and then a combination of infra-red and movement provides a better methodology for detecting user presence and avoids undesired switching off of equipment. This also permits shorter sensing timer periods to be set which increases the amount of energy that can be saved without compromising the user experience.

Better user alerts (flashing light emitting diode, buzzer, and text/graphic messaging on television avoids unexpected television and peripheral shutdown and user frustration and provides for a better user experience. A better user presence means equipment is likely to remain installed for longer. This results in a higher persistence of energy savings, and this is prized by electric utilities and energy efficiency programs.

In as much as the present invention is subject to many variations, modifications and changes in detail, it is intended that all matter contained in the foregoing description or shown in the accompanying drawings shall be interpreted as illustrative and not in a limiting sense.

The invention claimed is:

1. A sensor (101) for determining power supply to at least one appliance by sensing a first activity of a user and sequentially sensing a second activity of a user in an event the first activity is undetected, wherein the sensor (101) terminates the power supply in an event the second activity is undetected within a predetermined period of time, wherein the first activity is any one of infra-red activity from an infra-red enabled remote control, radio frequency activity, or movement of the user within a predetermined vicinity and the second activity is any one of infra-red activity from the infra-red enabled remote control, radio frequency activity, or movement of the user within the predetermined vicinity, and wherein the first activity and the second activity are different from one another such that: a) when the first activity is infra-red activity from the infra-red enabled remote control, the second activity is one of radio frequency activity or movement of the user within the predetermined vicinity; b) when the first activity is radio frequency activity, the second activity is one of infra-red activity from the infra-red enabled remote control or movement of the user within the predetermined vicinity; and c) when the first activity is movement of the user within the predetermined vicinity, the second activity is one of infra-red activity from the infra-red enabled remote control or radio frequency activity.

2. The sensor (101) according to claim 1 comprising:
at least one input (11) for a receiving signal;
at least one output (12) for a transmitting signal; and
at least one sensing module (14) configured to sense at least an activity for determining power supply to at least one appliance.

3. The sensor (101) according to claim 2, wherein said at least one sensing module (14) comprises a logic module (31) configured to sequentially sense said at least one activity.

4. The sensor (101) according to claim 3, wherein the logic module (31) regulates a timer (21) to track a first predetermined period of time for detecting a first activity.

5. The sensor (101) according to claim 4, wherein the logic module (31) triggers the timer (21) to track a subsequent predetermined period of time for detecting a second activity in an event that the first activity is undetected.

6. The sensor (101) according to claim 5, wherein the logic module (31) triggers an alert via an alerting means to user by the end of the subsequent predetermined period of time prior to termination of the power supply in an event that the second activity is undetected.

7. The sensor (101) according to claim 6, wherein the alerting means comprises an audio alert.

8. The sensor (101) according to claim 6, wherein the alerting means comprises a visual alert.

9. The sensor (101) according to claim 2, wherein said at least one sensing module (14) comprises a logic module (31) configured to trigger an action by an end of a sequential predetermined period of time.

10. The sensor (101) according to claim 2, wherein the sensor (101) is configured to be connected to a power strip.

11. The sensor (101) according to claim 10, wherein the power strip comprises a master and slave configuration.

12. The sensor (101) according to claim 2, wherein the sensor (101) is configured to be incorporated with a power strip.

13. The sensor (101) according to claim 2, wherein the sensor (101) is configured with high definition multimedia interface capabilities.

14. The sensor (101) according to claim 2, wherein the sensor (101) comprises a controller for controlling operation of a power strip or a high definition multimedia interface.

15. The sensor (101) according to claim 2, wherein the sensor (101) is any one or in combination of infra-red sensor, passive infra-red sensor, motion sensor, and radio frequency sensor.

16. The sensor (101) according to claim 2, wherein the sensor (101) is configured with a resettable timer function.

17. A sensing method of the sensor (101) in claim 2 comprising the steps of:
detecting a first activity for a first predetermined period of time;
detecting a second activity for a subsequent predetermined period of time if the first activity is undetected within the first predetermined period of time;
triggering an alert by the end of the subsequent predetermined period of time if the second activity is undetected; and
terminating power supply if the second activity is undetected by the end of the subsequent predetermined period;
wherein the first activity and the second activity are different from one another.

18. The method according to claim 17, wherein said at least one subsequent predetermined period is triggered in an event that the first activity is undetected within said at least one first predetermined period.

19. The method according to claim 17, wherein the alert is triggered via an alerting means.

20. The method according to claim 19, wherein the alerting means comprises an audio alert.

21. The method according to claim 19, wherein the alerting means comprises a visual alert.

22. The sensor (101) according to claim 2, wherein said at least one sensing module (14) is configured to track a sequential predetermined period of time.

23. The sensor (101) according to claim 22, wherein said at least one sensing module (14) comprises a timer (21) configured to track the sequential predetermined period of time.

\* \* \* \* \*